(12) United States Patent
Boskovic et al.

(10) Patent No.: US 7,043,559 B2
(45) Date of Patent: May 9, 2006

(54) SYSTEM FOR DISTRIBUTING OBJECTS TO MULTIPLE CLIENTS

(75) Inventors: Ronald Boskovic, San Jose, CA (US); Victor Ivashin, Danville, CA (US); Sean Miceli, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 742 days.

(21) Appl. No.: 10/185,834

(22) Filed: Jun. 27, 2002

(65) Prior Publication Data

US 2004/0003104 A1 Jan. 1, 2004

(51) Int. Cl.
*G06F 15/16* (2006.01)

(52) U.S. Cl. .................. 709/231; 709/204; 710/52; 710/54

(58) Field of Classification Search .............. 709/213, 709/214, 231, 233, 235; 710/52, 54; 711/147, 711/148; 345/558; 358/1.15, 1.16; 370/229, 370/412
See application file for complete search history.

(56) References Cited

U.S. PATENT DOCUMENTS

| | | |
|---|---|---|
| 5,506,624 A | 4/1996 | Moreton |
| 5,684,527 A | 11/1997 | Terui et al. |
| 5,819,048 A | 10/1998 | Okazaki et al. |

(Continued)

FOREIGN PATENT DOCUMENTS

| | | |
|---|---|---|
| EP | 0 633 694 A1 | 1/1995 |
| WO | WO 01/55877 A1 | 8/2001 |

(Continued)

OTHER PUBLICATIONS

A Novel Architecture for an ATM Switch, Jin Li and Chuan-lin Wu, Proceedings of the International Conference on Computer Design: VLSI in computers & Processor (ICCD '95).

(Continued)

*Primary Examiner*—Dung C. Dinh
*Assistant Examiner*—Avalon Blenman

(57) ABSTRACT

A method for updating a subset of a frame of an image is provided. The frame of the image is subdivided into a plurality of tiles. The method initiates with providing a fixed-size queue having a stationary last packet at a bottom of the fixed size queue. Then, a plurality of packets is stored in a time sorted order above the last packet, the plurality of packets corresponding to a frame of an image. Next, an updated packet is received, the updated packet corresponds to a previously received packet of the plurality of packets. Then, the previously received packet is replaced with the updated packet while maintaining the time sorted order. Replacing the previously received packet includes: identifying the previously received packet adjusting any pointers pointing at the previously received packet to point at a packet below the previously received packet; and moving the previously received packet to a top of the fixed size queue. An apparatus and system for distributing packets through a multi point dispatcher between multiple clients is also provided.

26 Claims, 13 Drawing Sheets

U.S. PATENT DOCUMENTS

| | | | |
|---|---|---|---|
| 6,021,132 | A | 2/2000 | Muller et al. |
| 6,029,194 | A | 2/2000 | Tilt |
| 6,141,731 | A * | 10/2000 | Beardsley et al. .......... 711/136 |
| 6,219,352 | B1 | 4/2001 | Bonomi et al. |
| 6,219,728 | B1 | 4/2001 | Yin |
| 6,246,682 | B1 | 6/2001 | Roy et al. |
| 6,246,719 | B1 | 6/2001 | Agarwal |
| 6,285,791 | B1 | 9/2001 | Bjorklund |
| 6,343,313 | B1 | 1/2002 | Salesky et al. |
| 2002/0156908 | A1* | 10/2002 | Basso et al. ................ 709/231 |
| 2003/0110344 | A1* | 6/2003 | Szczepanek et al. ........ 711/100 |

FOREIGN PATENT DOCUMENTS

| | | | |
|---|---|---|---|
| WO | WO 01/77870 | A2 | 10/2001 |

OTHER PUBLICATIONS

Multicast/Broadcast Mechanism For A Shared Buffer Packet Switch, vol. 34 No. 10A Mar. 1992, IBM Technical Disclosure Bulletin.

"Low-Complexity Video Coding for Receiver-Driven Layered Multicast", Steven McCanne, Martin Vetterli, Fellow, IEEE, and Van Jacobson, (pp. 983-1001), IEEE Communications vol. 15. No. 6. Aug. 1997.

"A Scalable Multicast Architecture for One-to-many Telepresentations"Jim Gemmell, Eve Schooler, and Roger Kermode, 1998 IEEE, (pp. 129-139).

"Noncollaborative Telepresentations Come of Age" D. James Gemmell and C. Gordon Bell, vol. 40, No. 4, Apr. 1997, (pp. 79-89), XP002261125.

* cited by examiner

Capturing Process  DSM Dispatcher Queue (1,0)
(1,1)
(1,2)
(1,3)
(1,4)
(1,5)
•••
(1,7)
(2,7)

Capturing Process                DSM Dispatcher Queue (0,1)
(0,2)
(0,3)
(0,4)
(0,5)
(0,6)
•••
(0,0)
(0,7)

Capturing Process      DSM Dispatcher Queue (5,6)
(5,7)
(0,1)
(0,2)
(0,3)
(0,4)
•••
(0,0)
(0,7)

Capturing Process

DSM Dispatcher Queue (4,6)
(4,7)
(5,6)
(5,7)
(0,1)
(0,2)
•••
(0,0)
(0,7)

SYSTEM FOR DISTRIBUTING OBJECTS TO MULTIPLE CLIENTS

BACKGROUND OF THE INVENTION

1. Field of the Invention

This invention relates generally to data transmission systems and more particularly to a method for dispatching updates to objects in a pre-defined set.

2. Description of the Related Art

With the widespread adoption of the Internet, more applications are becoming prevalent to disperse information over distributed networks. Multiple computers each having different capacity constraints are communicating with each other over these distributed networks. For example, as video conference becomes more popular the distribution of a presentation or video to multiple clients will naturally involve different computers with varying characteristics. As is generally known, the data is typically distributed in the form packets to each of the clients. The systems supporting multicasting, where a server sends data to multiple clients, such as for videoconferencing, include a module capable of distributing packets to a defined set of clients referred to as a multipoint dispatcher.

FIG. 1 is a simplified schematic of a multipoint dispatcher. Multipoint dispatcher 100 receives tiles from presentation capturing process 102. Presentation capturing process 102 is a process in which each of the clients is sent updated portions of a presentation, such as a slide show being video-conferenced. Thus, where only a portion of a slide changes between consecutive slides of the slideshow, only the changed portion of the slides is sent to each of the clients. For example, a certain tile, i.e., tile X which is a subset of the entire image, may differ from tile X of the previous capture. The packet containing tile X is dispatched to each of the clients wherein the client combines the tiles to reconstruct the original image.

The multipoint dispatcher manages the incremental disbursement of the changed portion of the slides. FIG. 2 is a simplified schematic of a buffer-less multipoint dispatcher configured to dispatch a new packet to three clients. Here new packet 104 is received by multipoint dispatcher 100 and distributed to clients 1–3. While a buffer-less multipoint dispatcher requires minimal memory resources and is easy to implement, the buffer-less multipoint dispatcher can only successfully serve a static set of clients that have sufficient bandwidth to keep up with the incoming packets. As the delivery is synchronous, each client has to be fast or the entire system will stall. In addition, each client will have to support the maximum speed of incoming packets. Therefore, each client will have to support a connection speed above the burst speed of the incoming packets since the packets can arrive in bursts.

FIG. 3 is a simplified schematic of a buffered multipoint dispatcher configured to distribute a received packet to three clients. Here, multipoint dispatcher 100 maintains buffers 106, 108, and 110 for clients 1–3, respectively. As new packet 104 is received, the packet is placed at the top of each of the client queues of buffers 106, 108 and 110. The packets are stored in the buffer and the packets at the bottom of the queue are sent to the respective client. Once sent, the packet is deleted from the queue. The delivery is a synchronous as the time for sending a packet to each client is different. The buffered multipoint dispatcher allows client to receive all their packets even if the clients have differing connection speeds. However, the buffered multipoint dispatcher is much more complex. Another shortcoming of the buffered multipoint dispatcher is that the memory requirements increase sharply with the number of clients since each client has a dedicated buffer. In some instances, especially where there are a large number of clients, the memory requirements may be prohibitive for support of such a system.

Another shortcoming of the above described multipoint dispatchers is that the addition of a new client is a cumbersome task. For example, a separate memory portion of the multipoint dispatcher is reserved for the original image data of the slide show or other type of presentation. This stored data is used for the initial addition of a new client, which further increases the memory requirements to support the system.

As a result, there is a need to solve the problems of the prior art to provide a method and apparatus for a multipoint dispatcher capable of supporting a large number of clients during a multicast operation through a multipoint dispatcher without requiring a large memory capacity. Additionally, the multipoint dispatcher is configured to easily add new clients.

SUMMARY OF THE INVENTION

Broadly speaking, the present invention fills these needs by providing a method and system for dispatching objects to multiple clients through a shared, fixed size, single-buffer multipoint dispatcher having minimal memory requirements. It should be appreciated that the present invention can be implemented in numerous ways, including as a process, a system, or a device. Several inventive embodiments of the present invention are described below.

In one embodiment, a method for updating a set of images for a presentation through a single-buffered multipoint dispatcher over a network to multiple clients is provided. The method initiates with defining a set of screens included in a presentation. Then, each screen of the set of screens is divided into tiles. Next, packets corresponding to each of the tiles of a first screen are stored in a single buffered multipoint dispatcher according to a time sorted hierarchy, wherein a top packet has a most recent time value and a bottom packet has a least recent time value. Then, each of the tiles of the first screen are compared with corresponding tiles of a second screen to determine non-matching tiles between the first screen and the second screen. Next, packets corresponding to each of the non-matching tiles are provided to the single buffered multipoint dispatcher. Then, packets corresponding to each of the non-matching tiles of the first screen are replaced with packets corresponding to each of the non-matching tiles of the second screen while maintaining the time sorted hierarchy, wherein the time sorted hierarchy is maintained to allow for supporting clients with different connection speeds at different frame rates.

In another embodiment, a method for distributing packets through a multi point dispatcher having a fixed-size buffer shared between multiple clients is provided. The method initiates with providing a fixed-size queue configured to contain a plurality of packets. Then, a client pointer is defined for one of the multiple clients. The client pointer indicates a most recent packet in the queue received by the one of the multiple clients. Next, an updated packet is received, where the updated packet corresponds to a previously received packet in the queue. Then, the previously received packet in the queue is replaced with the updated packet. The method operation of replacing the previously received packet includes determining if the client pointer is pointing to the packet being replaced. If the client pointer is pointing to the packet being replaced, the method includes adjusting the client pointer pointing to the packet being replaced to point to a packet below the packet being replaced.

In yet another embodiment, a method for updating a subset of a frame of an image is provided. The frame of the image is subdivided into a plurality of tiles. The method initiates with providing a fixed-size queue having a stationary last packet at a bottom of the fixed size queue. Then, a plurality of packets is stored in a time sorted order above the last packet, the plurality of packets corresponding to a frame of an image. Next, an updated packet is received, the updated packet corresponds to a previously received packet of the plurality of packets. Then, the previously received packet is replaced with the updated packet while maintaining the time sorted order. Replacing the previously received packet includes: identifying the previously received packet adjusting any pointers pointing at the previously received packet to point at a packet below the previously received packet; and moving the previously received packet to a top of the fixed size queue.

In still yet another embodiment, a computer readable media having program instructions for updating a subset of a frame of an image is provided. The frame is subdivided into a plurality of tiles. The computer readable media includes program instructions for storing a plurality of packets in a time sorted order in a fixed-size queue having a stationary last packet at a bottom of the fixed size queue. The plurality of packets correspond to a frame of an image. Program instructions for receiving an updated packet corresponding to a previously received packet of the plurality of packets are included. Program instructions for replacing the previously received packet with the updated packet while maintaining the time sorted order are also included in the computer readable media. The program instructions for replacing the previously received packet include: program instructions for identifying the previously received packet; program instructions for adjusting any pointers pointing at the previously received packet to point at a packet below the previously received packet; and program instructions for moving the previously received packet to a top of the fixed size queue.

In another embodiment, an integrated circuit chip configured to dispatch updates to objects in a pre-defined set of objects is provided. The integrated circuit chip includes logic for storing a plurality of packets in a time sorted order in a fixed-size queue having a stationary last packet at a bottom of the fixed size queue. The plurality of packets correspond to a frame of an image. Logic for receiving an updated packet corresponding to a previously received packet of the plurality of packets is included. Logic for replacing the previously received packet with the updated packet while maintaining the time sorted order is provided. The logic for replacing an updated packet includes: logic for identifying the previously received packet; logic for adjusting any pointers pointing at the previously received packet to point at a packet below the previously received packet; and logic for moving the previously received packet to a top of the fixed size queue.

In yet another embodiment, a system for distributing objects to multiple clients is provided. The system includes a plurality of clients. Each of the plurality of clients is configured to receive image data for display on a computer monitor. The image data is updated periodically. A server in communication with the client is included. The server includes a dispatcher enabled to store a first set of packets defining the image in a fixed-size queue shared by the plurality of clients. The first set of packets are stored according to an introduction into the fixed size queue, where a most recently introduced packet is stored at a top of the fixed size queue and a least recently introduced packet is stored at a bottom of the fixed size queue. The dispatcher is configured to receive an updated packet, the updated packet replacing a corresponding packet of the first set of packets. A client pointer associated with each of the plurality of clients is included. The client pointer points to a most recently received packet for the corresponding client. However, the client pointer is configured to point to a next lower packet in the fixed size queue when the updated packet is the most recently received packet for the corresponding client.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DEFINITIONS

An "image tile" as used herein refers to a subset of an image defined by its position, size, shape and image data that belongs to it.

A "dynamic set" as used herein refers to a set in which elements can be added or dropped at arbitrary times.

A "client" as used herein refers to a remote process with which a controlled connection is maintained.

A "packet" as used herein refers to a data block intended for a client and formatted in a way that is understandable by the client.

A "multipoint dispatcher" as used herein refers to a module capable of distributing packets to a defined set of clients.

A "burst" as used herein refers to a sequence of packets delivered at a speed significantly above the average overall delivery speed.

A "buffer" as used herein refers to a structure that keeps objects in memory for a temporary amount of time.

A "client pointer" as used herein refers to a client specific reference to a packet inside a multipoint dispatcher's shared queue.

A "DSM dispatcher" as used herein refers to a dynamic, single-buffered, multipoint dispatcher for a fixed set of updateable objects.

Client latency is defined as follows:

Client latency=most recent time stamp–time stamp of the packet pointed at by the client pointer

DETAILED DESCRIPTION OF THE PREFERRED EMBODIMENTS

Figure 1:
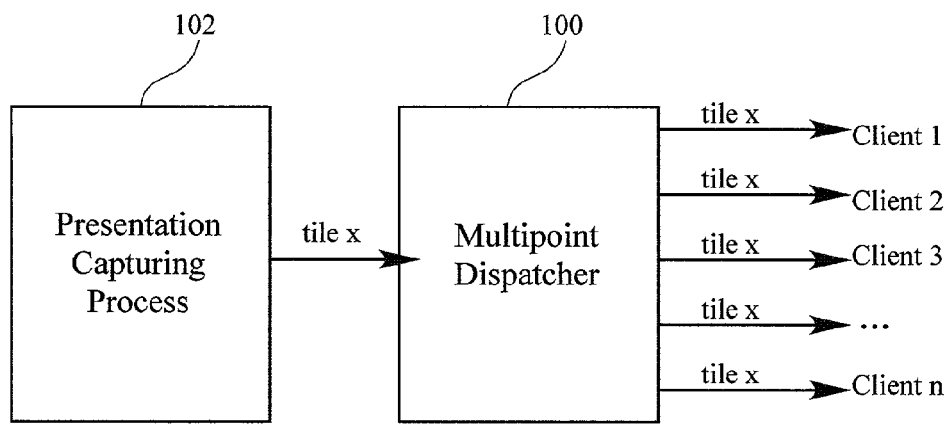
FIG. 1 is a simplified schematic of a multipoint dispatcher.
Figure 2:
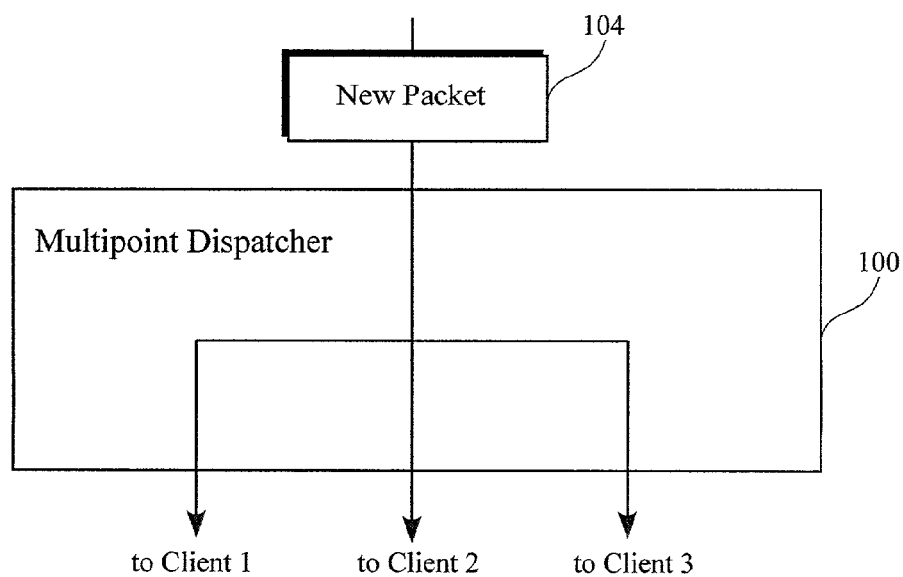
FIG. 2 is a simplified schematic of a buffer-less multipoint dispatcher configured to dispatch a new packet to three clients.
Figure 3:
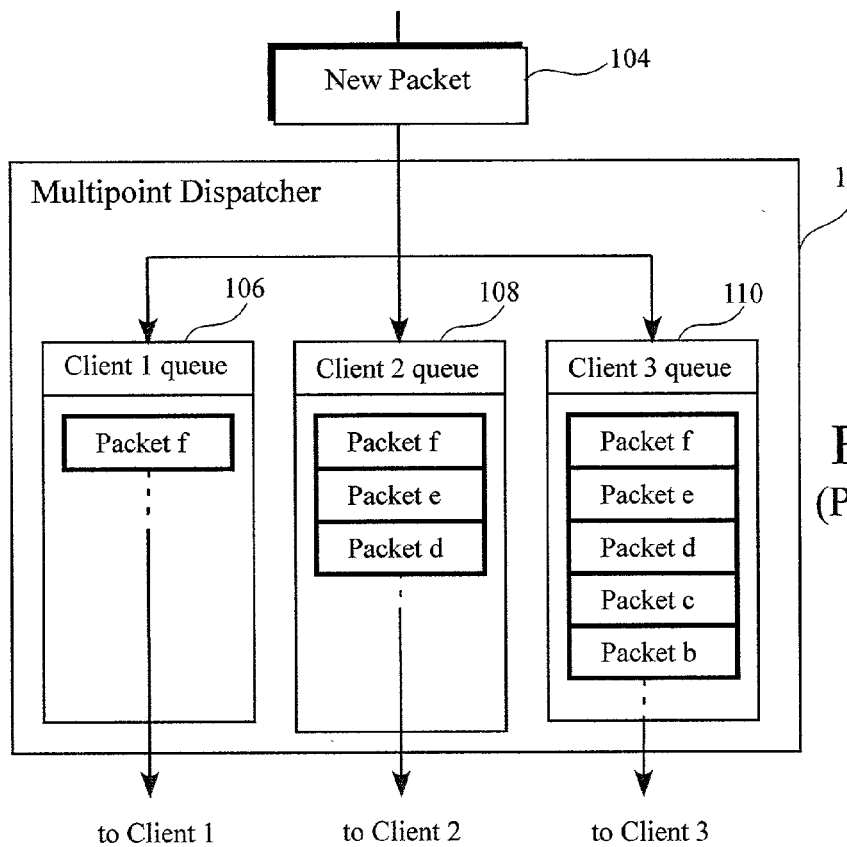
FIG. 3 is a simplified schematic of a buffered multipoint dispatcher configured to distribute a received packet to three clients.

An invention is described for an apparatus and method for dispatching updates to objects in a set through a shared fixed size priority queue. It will be obvious, however, to one skilled in the art, that the present invention may be practiced without some or all of these specific details. In other instances, well known process operations have not been described in detail in order not to unnecessarily obscure the present invention. FIGS. 1–3 are described in the "Background of the Invention" section.

The embodiments of the present invention provide a method and apparatus for using a dynamic single-buffered multipoint dispatcher for a fixed set of updateable objects. The dynamic single-buffered multipoint dispatcher is configured to reduce the memory requirements of the multipoint dispatcher and allow for slower frame rates for slower clients, while keeping all clients up-to-date with the most recent data. By representing each client buffer as a subset of the single, shared buffer and by setting a fixed size for the shared buffer, separate memory structures are not necessary. In one embodiment, the multipoint dispatcher is further configured to meter multiple packets, referring to the same object, to slow clients. Thus, slow clients will not receive multiple packets referring to the same object, i.e., the slower client are provided a slower frame rate. In addition, the single-buffered multipoint dispatcher is enabled to support adding new clients without any assistance from the process that is sending the packets and without any need to store a base image. In one embodiment, a bandwidth control protocol is included to support slow and variable speed clients. As will be explained in more detail below, maintaining a single queue and a list of pointers into that queue (indicating which packet is next to be sent to each user), results in each packet being queued only once regardless of the number of clients.

Figure 4:
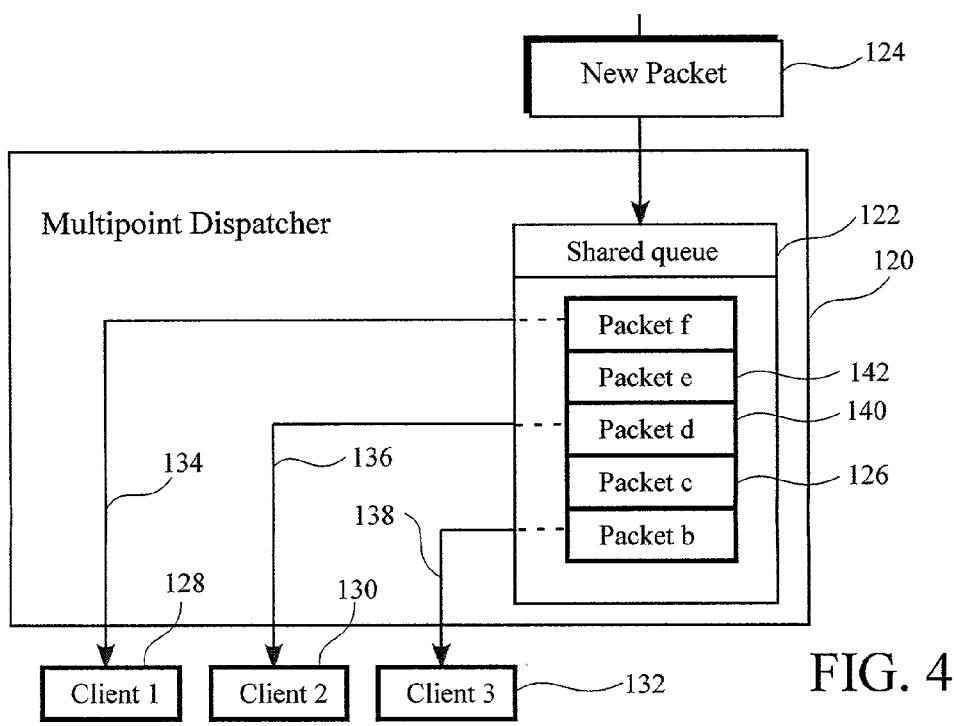
FIG. 4 is a simplified schematic diagram of a single-buffered multipoint dispatcher having three clients in accordance with one embodiment of the invention.

FIG. 4 is a simplified schematic diagram of a single-buffered multipoint dispatcher having three clients in accordance with one embodiment of the invention. Multipoint dispatcher 120 includes shared queue 122. In one embodiment, shared queue 122 is a first in-first out (FIFO) buffer. As new packet 124 is received it is placed on top of shared queue 122. Client 1 128, client 2 130, and client 3 132 are each associated with client pointer 134, client pointer 136, and client pointer 138, respectively. Consequently, each time a packet is to be sent to a client, the dispatcher looks up which packet the corresponding client pointer is pointing to, and sends that packet to the corresponding client. The client pointer is then adjusted to point to the packet above the packet that has been sent. For example, if client 2 130 has been sent packet d 140, then client pointer 136 is adjusted to point to packet e 142. In one embodiment, once the bottom packet has been sent to all clients, it is removed from the queue.

Figure 5A:
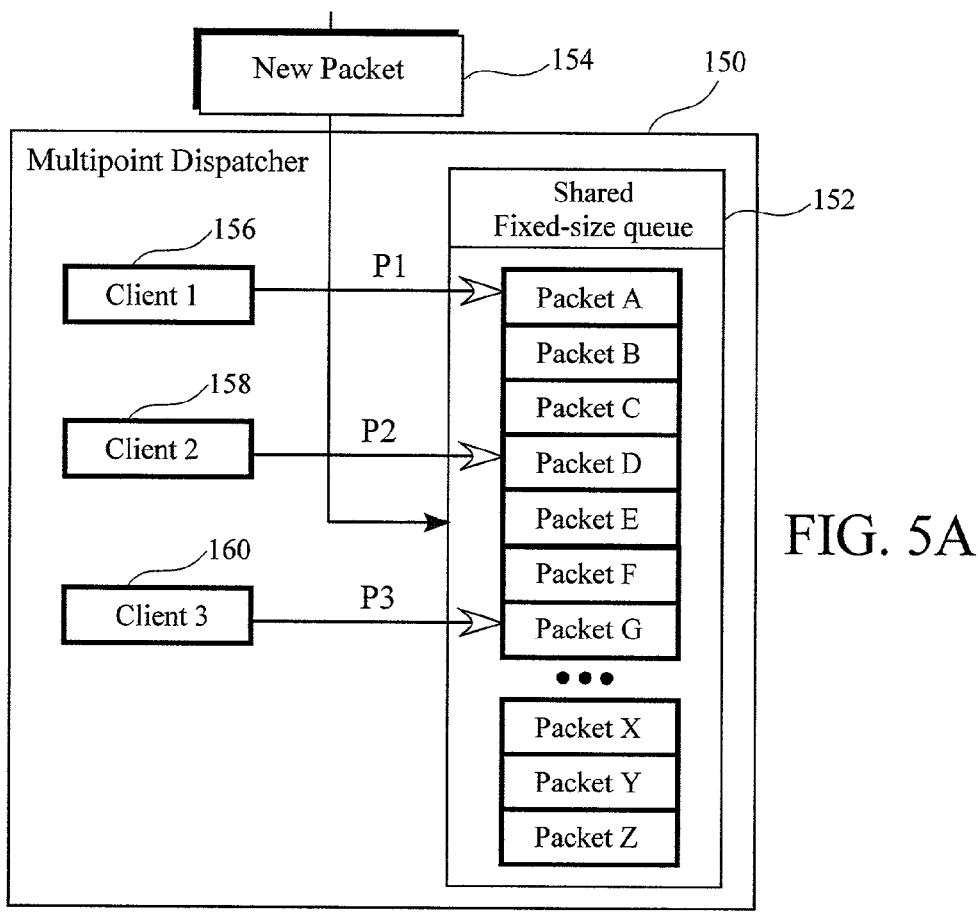
FIG. 5A is a simplified schematic of a dynamic single-buffered multipoint (DSM) dispatcher configured to maintain the latest copy containing each element, i.e., image tile, of the originating set in accordance with one embodiment of the invention.

FIG. 5A is a simplified schematic of a dynamic single-buffered multipoint (DSM) dispatcher configured to maintain the latest copy containing each element, i.e., image tile, of the originating set in accordance with one embodiment of the invention. DSM dispatcher 150 includes shared fixed size queue 152. Shared fixed-size queue 152 serves as a shared buffer and also maintains all the information necessary for a newly added client to be introduced without requiring additional data from the process supplying the packets. Packets A–Z are stored in shared fixed-size queue 152. The packets inside shared fixed-size queue 152 represent the latest update for all the elements in the originating set, such as with successive screens of a slideshow. As will be explained in more detail below, the packets can represent image tiles of a video conference multicast presentation sent to multiple clients. In this embodiment, dispatcher 150 is in communication with client 1 156, client 2 158, and client 3 160. Associated with clients 1–3 are client pointers P1–P3, respectively. Client pointers P1–P3 point to the most recent packet in the table the respective client has received. It should be appreciated that the most recent packet the client has received is not necessarily the last packet the client has received, since the last packet the client received may have been updated.

Still referring to FIG. 5A, new packet 154 is transmitted by a packet serving process in one embodiment. Here, new packet 154 represents an update of a packet contained in shared fixed-size queue 152. New packet 154 is received by DSM dispatcher 150. For exemplary purposes, new packet 154 is identified as an update for packet D in shared fixed-size queue 152. Thus, new packet 154 replaces packet D to maintain the size of queue 152 as will be explained in more detail below.

Figure 5B:
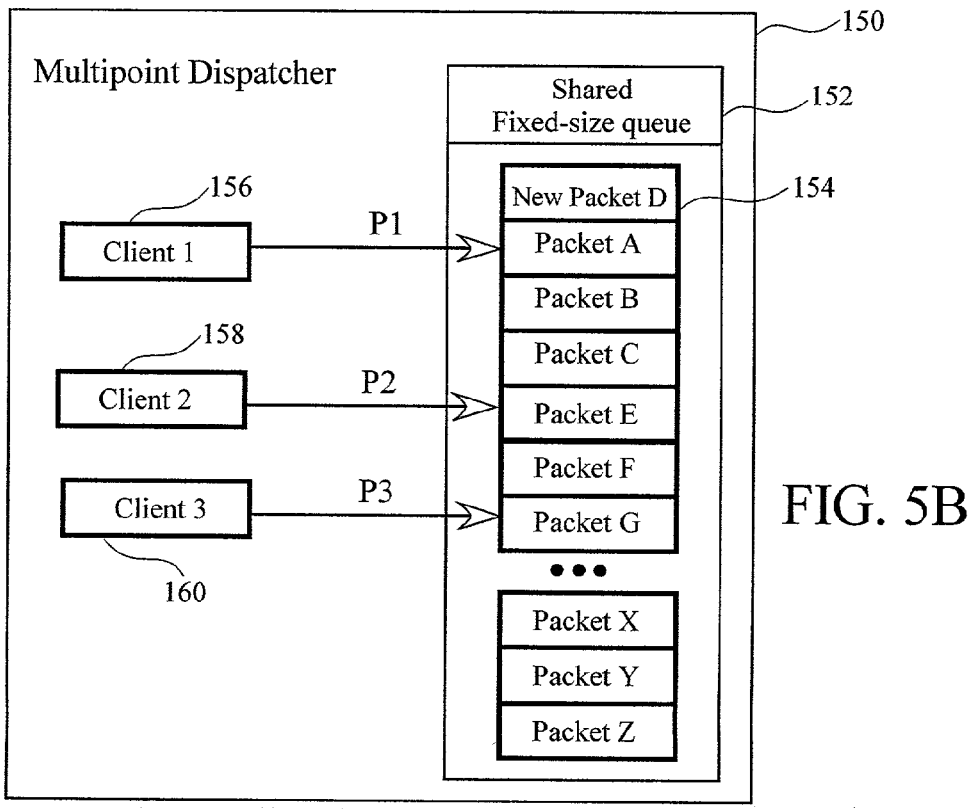
FIG. 5B is a simplified schematic diagram of the DSM dispatcher after receiving a new packet in accordance with one embodiment of the invention.

FIG. 5B is a simplified schematic diagram of the DSM dispatcher after receiving a new packet in accordance with one embodiment of the invention. New packet 154, which is an update of packet D, is placed on the top of queue 152 since it has the most recent time stamp, i.e., it was introduced into the queue most recently. It should be appreciated that the size of the queue is maintained because the outdated packet (packet D) is replaced by new packet D 154. At the same time, DSM dispatcher 150 determines if any client pointers are affected by the addition of the new packet to the top of queue 152 or the removal of the outdated packet from its previous position in the queue. For example, DSM dispatcher 150 has three clients. Client 1 156 has already received all the packets in the queue including outdated packet D, client 3 160 is due to receive outdated packet D after receiving packets F and E, and client 2 158 has received outdated packet D but is pointing to outdated packet D since client 2 has yet to receive packet C.

Still referring to FIG. 5B, after new packet D 154 replaces outdated packet D, client 1 156 will receive new packet D next. Client 3 160 will receive new packet D, however, packets C, B and A are received before new packet D is received by client 3. Client 2 is still due to receive packet C next, but since packet D has moved client pointer P2 for client 2 is moved to the next lowest packet, i.e., packet E, as packet E is the most recent packet in the queue that client 2 has received. While FIGS. 5A and 5B illustrate the DSM dispatcher having 3 clients, it will be apparent to one skilled in the art that the dispatcher can interface with any number of suitable clients. Furthermore, additional clients can easily be added as will be explained in more detail below.

FIGS. 5A and 5B illustrate clients 1–3 pointing to different packets. While each of the client pointers initiate at the bottom of the shared fixed size queue 152, each of the clients will advance upward at their own speed. It should be appreciated that the different clients may have faster connections to the dispatcher or the client computers themselves can have different operating speeds. Thus, in FIGS. 5A and 5B, client 1 156 can process the data more quickly than client 3 160. One skilled in the art will appreciate that no bandwidth control is necessary here since the speed which packets are sent to a client is determined by how fast each client can handle the packets.

Figure 6:
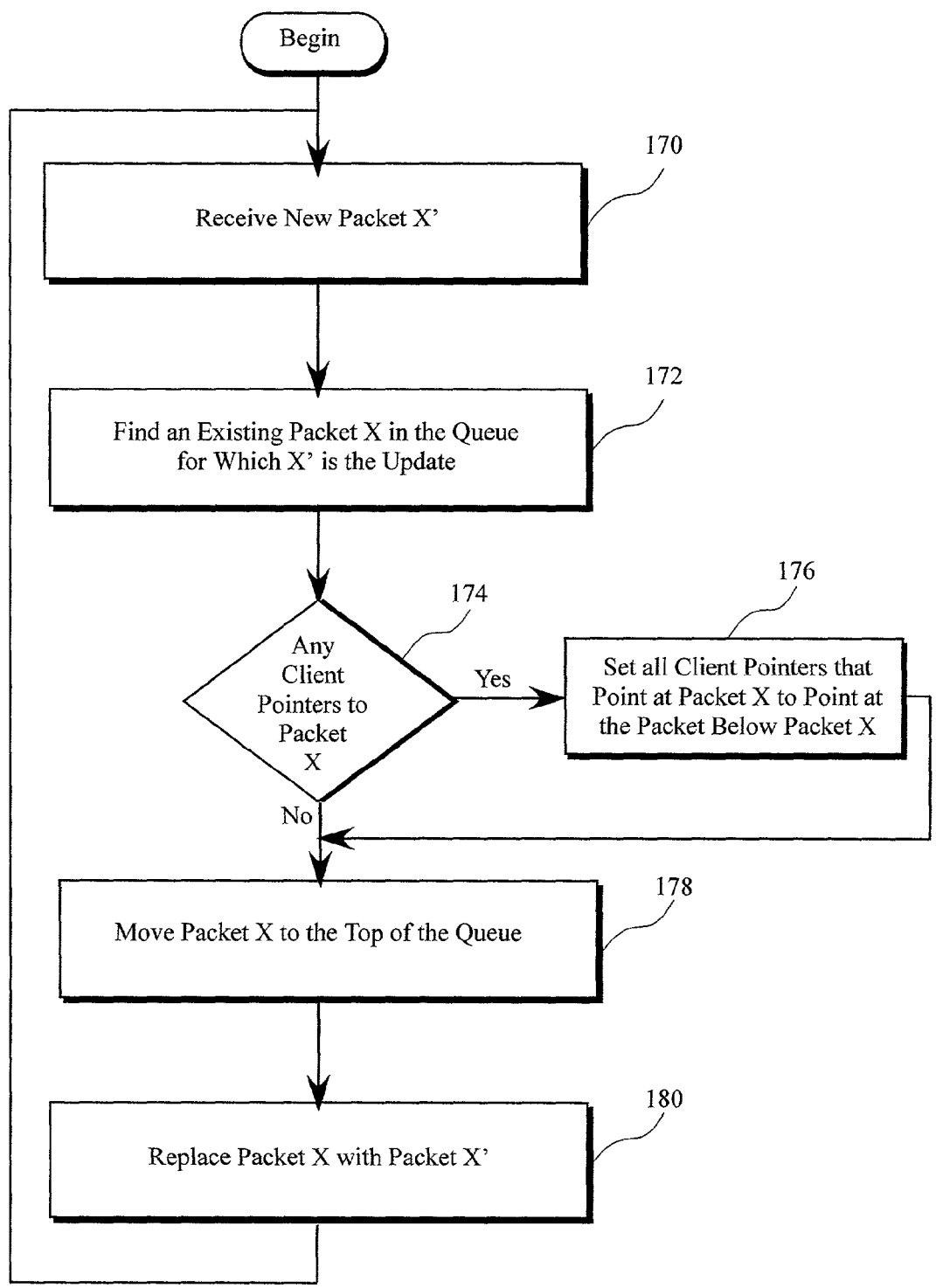
FIG. 6 is a flowchart diagram of the method operations for processing packets received by a DSM dispatcher in accordance with one embodiment of the invention.

FIG. 6 is a flowchart diagram of the method operations for processing packets received by a DSM dispatcher in accordance with one embodiment of the invention. The method initiates with operation 170 where a new packet X' is received by the DSM dispatcher. The method then advances to operation 172 where an existing packet X, for which new packet X' is the update, is located in the queue. Here, the queue is a shared fixed size queue such as the queue in FIGS. 5A and 5B. The method then moves to decision operation 174 where it is determined if any client pointers are pointing to packet X. If one or more client pointers are pointing to packet X, then the method advances to operation 176 where each of the client pointers pointing to packet X is set to point at the packet below packet X. Thus, each client pointer is set to point at the most recent packet in the queue that the corresponding client has received. If none of the client pointers are pointing to packet X, then the method proceeds from decision operation 174 to operation 178 where packet X is moved to the top of the queue. For example packet D of the shared fixed size queue of FIG. 5A would be moved to the top of the queue here.

The method of FIG. 6 then proceeds to operation 180 where packet X is replaced with packet X'. Thus, the packets representing the latest updates for the originating elements are kept in the queue. Additionally, the packets are stored in a time sorted fashion according to the time each packet is introduced into the queue. That is, as each update for an existing packet is received, the existing packet is moved to the top of the queue and replaced by an updated packet. The updated packet remains at the top of the queue as it is the most recently received packet into the queue.

Thus, the DSM dispatcher is configured to send packets to clients with different connection speeds at different frame rates. As illustrated in FIGS. 5A, 5B and 6, incoming packets replace packets that are already in the queue. The replaced packets may or may not have been sent out to all clients. Depending on the relative speed of the clients and the speed at which the packets are coming in, a packet may be replaced after it has been sent to a first client, but before it has been sent to a second client. This results in the first client having received both the old and the new packet, while the second client will only receive the new packet. Therefore, the second client will receive fewer packets over the same period of time, which means it will have the slower frame rate. Referring to FIG. 5B, client 1, 156 has already received the outdated version of packet D and will receive new packet D 154. However, client 3 160 receives only new packet D 154. In effect, client 3 receives only the newest copy of packet D, therefore, client 3 is associated with a lower effective bandwidth because client 3 is slower. Consequently, there is no need to maintain any tables which must be accessed in order to achieve different bandwidths for clients having differing performance capacities.

The DSM dispatcher is configured to support easily adding new clients. In one embodiment the clients are enabled to construct a working default configuration. Here, after a new client is added, it is initialized using a default configuration. The dispatcher creates a corresponding client pointer that points below the last valid packet in the queue as will be explained below with reference to FIG. 11. After a certain amount of time, all of the objects in the default configuration will be replaced by their current versions through packets received from the dispatcher. Therefore, a current state of the set can be obtained from a DSM dispatcher without requesting additional data from the process supplying the DSM dispatcher with packets. That is, there is no need to supply a base image to the client. The DSM dispatcher is supplied with the latest versions of each of the packets and by pointing a new client at a bottom of the shared fixed size queue, each new client can initiate its own base image.

Figure 7A:
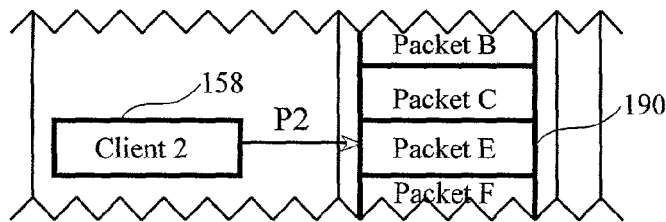
FIG. 7A is a simplified schematic diagram of the configuration of a section of the DSM dispatcher before sending a packet to a client in accordance with one embodiment of the invention.

FIG. 7A is a simplified schematic diagram of the configuration of a section of the DSM dispatcher before sending a packet to a client in accordance with one embodiment of the invention. Here, pointer P2 associated with client 2 158 is pointing to packet E in the shared fixed size queue of the DSM dispatcher. Thus, packet E 190 is the most recent packet received by client 2. Once a signal is received by the DSM dispatcher that client 2 is ready to receive the next time sorted packet from the queue, the dispatcher will look up the client pointer and advance it to point at the packet above packet E 190.

Figure 7B:
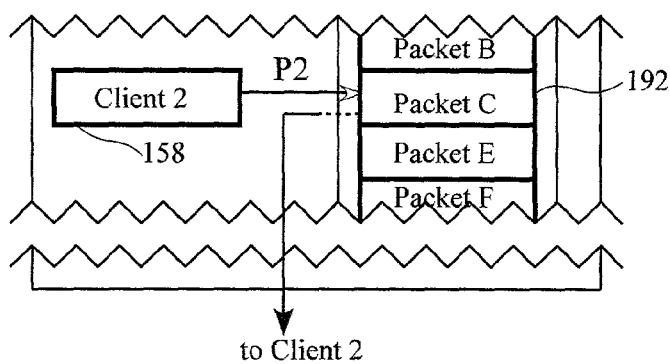
FIG. 7B is a simplified schematic diagram of the configuration of a section of the DSM dispatcher after sending a packet to a client in accordance with one embodiment of the invention.

FIG. 7B is a simplified schematic diagram of the configuration of a section of the DSM dispatcher after sending a packet to a client in accordance with one embodiment of the invention. Continuing from the example discussed with reference to FIG. 7A, pointer P2 associated with client 2 158 has been moved to point at packet C 192, i.e., the packet above packet E. At the same time, packet C 192 is transmitted to client 2 158. It should be appreciated that this process will repeat until pointer P2 for client 2 158 points to the most recently received packet in the shared fixed size queue. That is, the process will continue until the pointer is pointing at the top packet of the queue.

Figure 8:
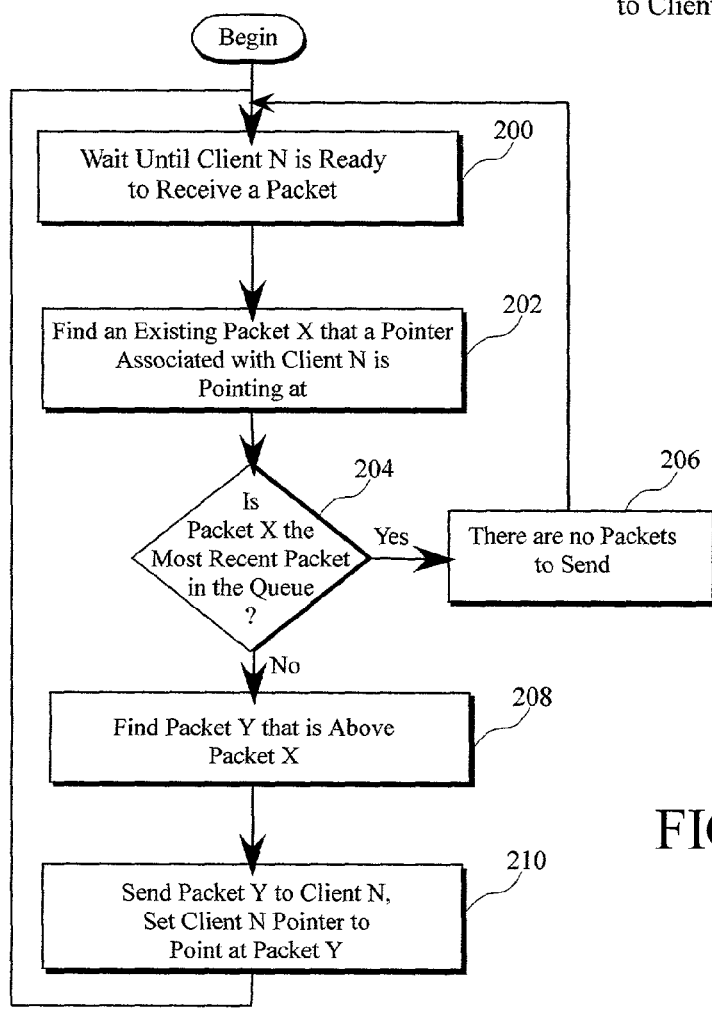
FIG. 8 is a flowchart diagram of the method operations for sending a packet from the DSM dispatcher to a client in accordance with one embodiment of the invention.

FIG. 8 is a flowchart diagram of the method operations for sending a packet from the DSM dispatcher to a client in accordance with one embodiment of the invention. The method initiates with operation 200 where it is indicated that client N is ready to receive a packet. It will be apparent to one skilled in the art that the dispatcher can be configured to receive a signal from client N indicating that client N is ready to receive a signal. The method then advances to operation 202 where, in response to receiving the signal that client N is ready to receive a packet, an existing packet X is located. Packet X is being pointed at by a pointer associated with client N. The method then proceeds to decision operation 204 where it is determined if packet X is the most recent packet in the queue. If packet X is the most recent packet in the queue, i.e., packet X is at the top of the queue, then the method proceeds to operation 206. In operation 206, a signal is sent indicating that there are no packets to be sent and the method returns to operation 200. It will be appreciated by one skilled in the art that a wait period can be built in here to define a time interval for waiting to check if client N is ready to receive a packet. The packets are sent out to each of the clients of the dispatcher asynchronously in one embodiment of the invention.

Still referring to FIG. 8, if packet X is not the most recent packet in the queue, i.e., packet X is not at the top of the queue, then the method proceeds from decision operation 204 to operation 208. In operation 208, a packet Y is located, wherein packet Y is located above packet X in the shared fixed size queue. The method then moves to operation 210 where packet Y is sent to client N and a pointer associated with client N is set to point at packet Y. It should be appreciated that FIGS. 7A and 7B pictorially illustrate the method operations described herein with respect to FIG. 8.

Figure 9:
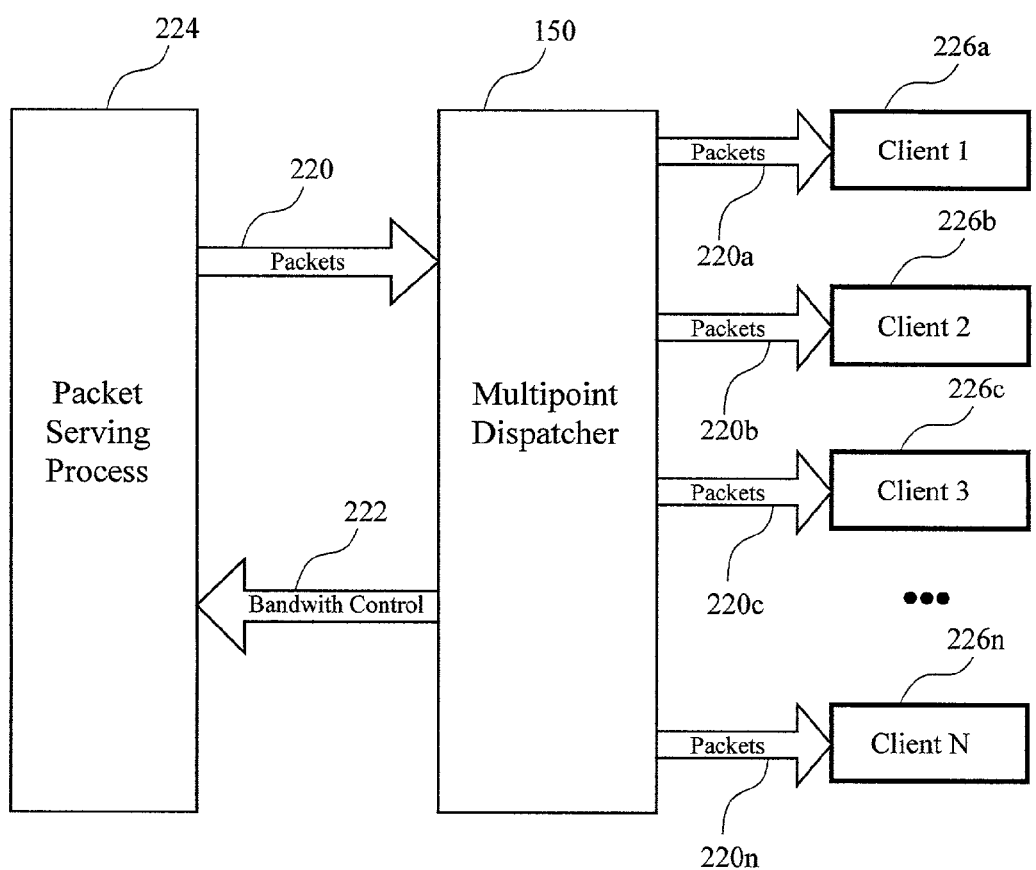
FIG. 9 is a simplified schematic diagram of a DSM dispatcher having a bandwidth control channel in accordance with one embodiment of the invention.

FIG. 9 is a simplified schematic diagram of a DSM dispatcher having a bandwidth control channel in accordance with one embodiment of the invention. DSM dispatcher 150 receives packets 220 from packet serving process 224. Dispatcher 150 is capable of asynchronously distributing packets 220a–220n to client 1 226a-client n 226n, respectively. Bandwidth control channel allows for a regulating protocol to be executed between dispatcher 150 and packet serving process 224. In one embodiment, the regulating protocol enables dispatcher 150 to notify packet serving process 224 to adjust speed at which the packets are being delivered to the dispatcher.

Each client receives packets from the queue at its own pace (depending on connection speed). Assuming different clients have different connection speeds, client latencies will gravitate toward different average values. Therefore, a client with a fast connection will tend to have a lower average latency, while a client with a slow connection will have a higher average latency. As is generally known, all client latencies are inversely proportional to the incoming packet speed.

In effect, client latency is a value that can be quickly accessed and can be used to measure speeds of client connections relative to the incoming packet speed. This information can be used to regulate the refresh rate of the packet-serving process. When appropriate, packet-serving process can increase or decrease the number of object updates which results in greater or fewer total number of packets sent.

Still referring to FIG. 9, if dispatcher 150 receives new packets in bursts, the period after the bursts gives each of the clients time to catch up. Accordingly, all client pointers will eventually reach the top of the queue, unless the packets 220a–220n are coming in faster than a client 226a–226n can receive them, i.e., an average incoming packet speed is greater than that client's connection speed. Where a client is having difficulty catching up and the average latency for the client exceeds a predefined threshold value, it would be necessary to notify packet serving process 224 feeding packets 220 to slow down its refresh rate. For example, if packet serving process 224 is providing packets 220 to dispatcher 150 at a rate of ten frames per second, which the clients are having difficulty in keeping up with, the dispatcher can request that the packet serving process provide the packets at 5 frames per second. After a certain time period the dispatcher can re-check the ability of the clients to keep up with the modified rate and further modify the rate based upon the latencies of the clients. On the other hand, if all the clients have a very easy time handling all the new packets and their latencies are very small, the dispatcher may notify the process feeding the packets to increase the frame rate. It will be apparent to one skilled in the art that the frame rate may be applicable to a slideshow where the slideshow incorporates an animated graphics interchange format (GIF) file.

In one embodiment, the packets can be grouped. That is a dispatcher can be configured to send packets in groups rather than one by one. Here, packet grouping logic can be defined to allow for an enhanced presentation of the image tiles. In a basic DSM dispatcher, grouping can be done by time stamp or by index. With a time stamp, the packets are grouped according to the time introduced into the DSM dispatcher. Alternatively, an index indicating the position of tiles of a slideshow can be used as a reference to group packets. For example, since the borders of a presentation change the least while a middle section containing text changes the most, the location of the least changing or most changing tiles can be determined by the index. Accordingly the tiles can be grouped. In a more advanced implementation, such as one that is able to understand the format and content of the packets, more complex grouping algorithms may be implemented (e.g. adjacent image tiles are grouped).

When sending groups of packets, an optimal range of the transmission sizes will usually be chosen for each client, based on their connection bandwidth, latency, frame rate, etc. Depending on the image tile sizes, compression method used, and consequent relative sizes of packets, the optimal size can be described in the maximum and minimum optimal number of packets. For example, the packets may be sent in groups less than or equal to n, but greater than n/2 (when possible). Table 1 below illustrates one embodiment of how the packets are banded depending on the number of packets in a group. This advanced method of transmission management can be used to achieve balance between client's bandwidth, latency and frame rate, or to optimize a dispatcher's outgoing transmission rate by appropriating the transmission size to best fit the underlying networking protocol.

TABLE 1

| | |
|---|---|
| Less than n/2 | Combine group with next, reconsider |
| Between n/2 and n | Send all packets in the group |
| Greater than n | Send first n packets in the group only |

Figure 10:
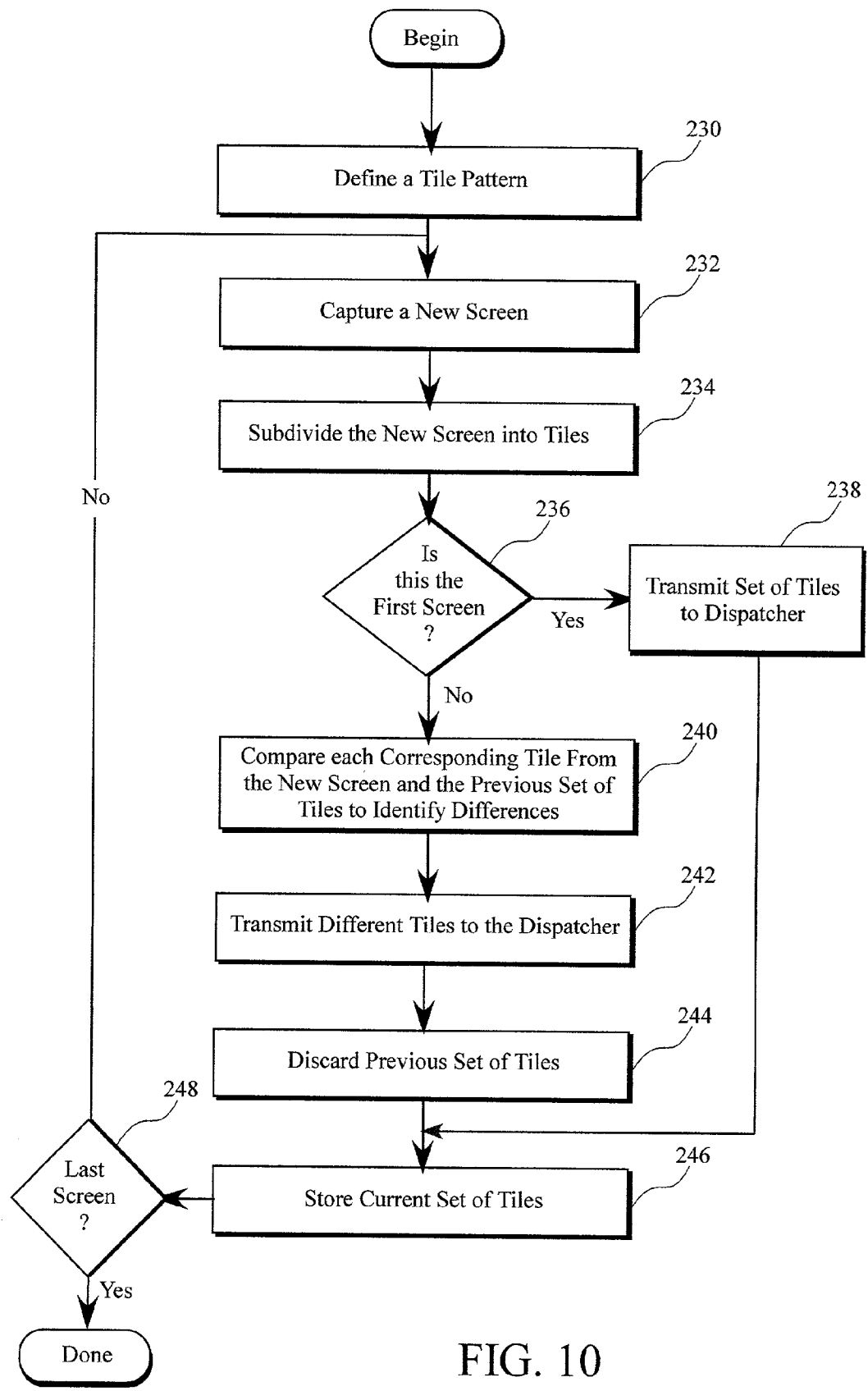
FIG. 10 is a flowchart diagram of the method operations performed by a packet serving process for maintaining an updateable set of image tiles with respect to a slideshow in accordance with one embodiment of the invention.

FIG. 10 is a flowchart diagram of the method operations performed by a packet serving process for maintaining an updateable set of image tiles with respect to a slideshow in accordance with one embodiment of the invention. Here, as each screen of the slideshow is captured, the screen is divided into tiles using the same geometry each time. The new set of tiles is compared to the one captured prior to it, and non-matching tiles are sent out to the dispatcher as updated packets. The method initiates with operation 230 where a tile pattern is defined. For example, a pattern for a set of tiles for a slideshow screen is defined here. As will be explained in more detail below, the pattern can be defined where each of the tiles in the set are equal in size, where there are differences between the sizes of each tile or some combination thereof. It will be apparent to one skilled in the art that the defined pattern should stay consistent for each screen of the slide show to minimize processing.

Still referring to FIG. 10, the method advances to operation 232 where a new screen is captured. Here, a screen of a slideshow, such as a POWERPOINT® presentation, is captured. The method then proceeds to operation 234 where the new screen is subdivided into tiles according to the pattern defined in operation 230. Here, the set of tiles is the originating set of tiles when the identified screen is the first screen of a slideshow. The method then moves to decision operation 236 where it is determined if the identified screen is a first screen. If the identified screen is a first screen then the method proceeds to operation 238 where the set of tiles is transmitted to the dispatcher. Here, the data from the first screen defines the originating set of packets in the shared fixed size queue of the dispatcher. The method then moves to operation 246 where the first set of tiles is stored as the current set of tiles.

If the identified screen is not the first screen in decision operation 236, then the method proceeds to operation 240 where each corresponding pair of tiles from the new screen and the previous set of tiles are compared to identify differences. For example, a slideshow may use a constant background but the tiles containing text may change from screen to screen. The changing tiles between screens are identified here. The method then advances to operation 242 where the data corresponding to the tiles identified as different in operation 242 are transmitted to a dispatcher. Here, the updated packets to the originating set of packets are sent to the dispatcher as described with reference to FIGS. 5A and 5B. The method then advances to operation 244 where the previous set of tiles is discarded. One skilled in the art will appreciate that by replacing the set of tiles from the previous screen with the set of tiles from the new screen allows for comparing successive screens, i.e., comparing a second screen to a third screen and so on. The method the proceeds to operation 246 where the current set of tiles is stored. In one embodiment the current set of tiles is stored in the shared fixed size queue. The method then moves to decision operation 248 where it is determined if there are more screens. If the current screen is the last screen, then the method terminates. If the current screen is not the last screen, then the method returns to operation 232 where the above described method is repeated. That is, as each screen is captured, it is divided into tiles using the same geometry each time. The new set of tiles is compared to the one captured prior to it i.e., the previous set of tiles, and non-matching tiles are sent out to the dispatcher.

Figure 11:
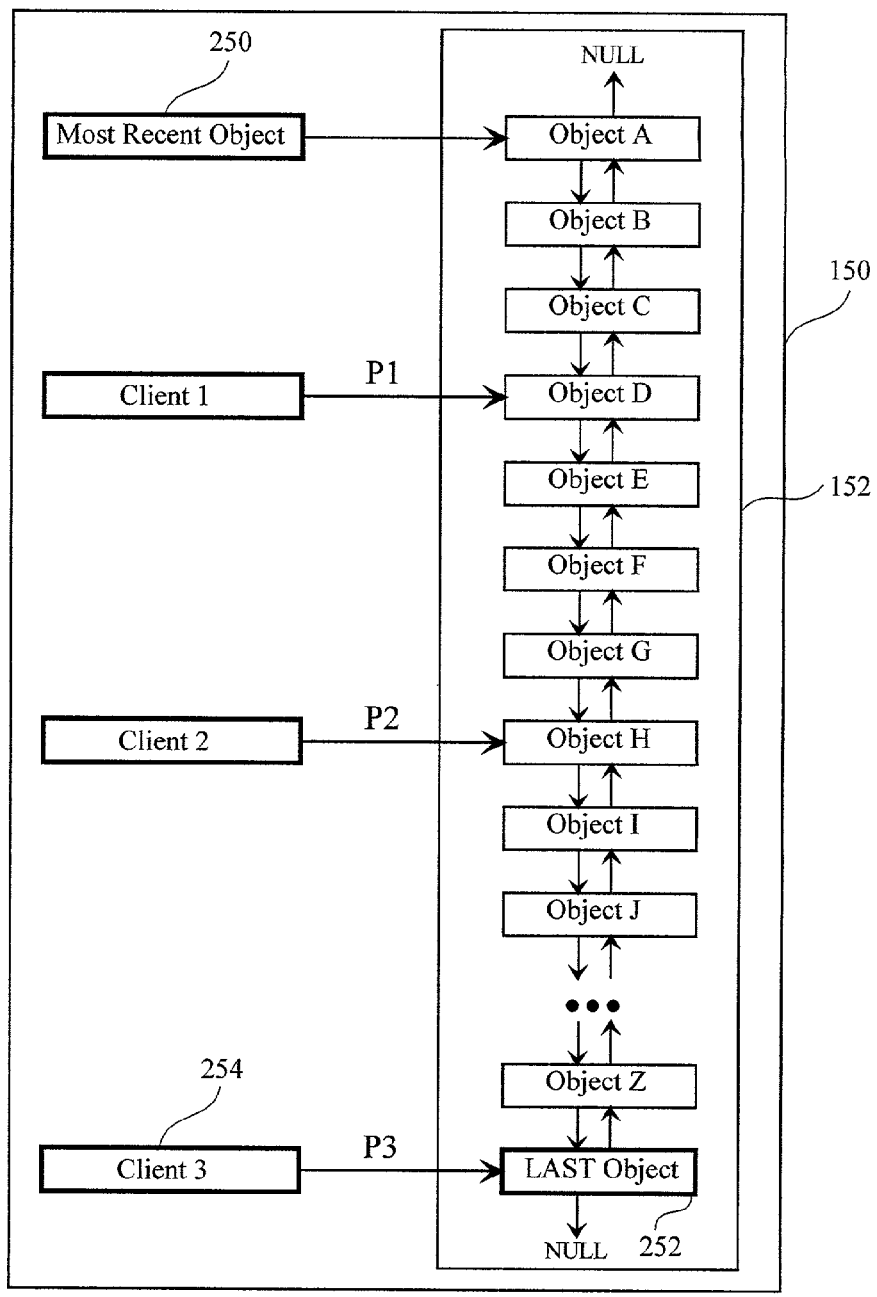
FIG. 11 is a simplified schematic diagram of a dispatcher implementation data structure incorporating a doubly-linked list in accordance with one embodiment of the invention.

FIG. 11 is a simplified schematic diagram of a dispatcher implementation data structure incorporating a doubly-linked list in accordance with one embodiment of the invention. DSM dispatcher 150 includes shared fixed size queue 152 having a set of objects. The set of objects of shared fixed size queue 152 are configured as a doubly-linked list. One skilled in the art will appreciate that a doubly-linked list allows for movement of the objects in either an up or down direction, removal of an object and to place the object at the top of shared fixed size queue 152. In order to determine a starting point and an endpoint for the doubly-linked list a head and a tail are maintained. Last object 252 is the tail while most recent object 250 points to object A, i.e., the top object, which is the head. Last object 252 is not associated with any tiles, thus it will never be updated. Therefore last object 252 will remain at the bottom of shared fixed size queue 152. Accordingly, last object 252 is useful for adding new clients. For example, client 3 254 is identified as a new client, then pointer P3 is created for client 3 to point to last object 252. Thus, client 3 will receive each object in shared fixed size queue 152. Once pointer P3 is pointing to object A (the most recent object) client 3 will have received each of the objects from shared fixed size queue 152.

Figure 12:
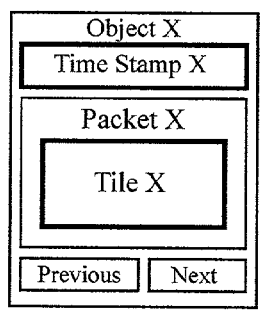
FIG. 12 is a schematic diagram of a link object data structure used for objects of FIG. 11 in accordance with one embodiment of the invention.

FIG. 12 is a schematic diagram of a link object data structure used for objects of FIG. 11 in accordance with one embodiment of the invention. Each of the objects include a time stamp, a packet containing the data for a corresponding tile and data for the previous object (object below) and the next object (object above) in the queue. Thus, as a packet is received, the object holding a matching tile is located. The packet inside the object is replaced with the updated object and the object's time stamp is updated to reflect the most recent value. As mentioned previously the object is pushed to the top of the queue, i.e., doubly linked list. When the time comes for a packet to be sent to a client, the object above the one pointed to by the client pointer is located, i.e., the next object. Then the packet inside the next object is sent to the client once the client has indicated it is ready to receive the next object. In one embodiment, the object itself remains after the packet has been sent. That is, the client pointer is the only variable that is updated as defined by the DSM dispatcher design.

Referring back to FIG. 11, the most recent object pointer is maintained for client latency calculations and also to allow easier movement of updated objects to the top of the queue. For example, bandwidth control can be implemented in accordance with the prototype of FIG. 11. The average latency is calculated by averaging the client latency at the moment each k-th packet is received (k being a set positive integer value, e.g. 10). If one of the clients maintains an average client latency that is below a pre-set value (e.g. number of tiles/10), or if all the average client latencies maintain values above a different threshold (e.g. number of tiles/25), a bandwidth adjustment request is sent to the capturing process, i.e., packet serving process. Depending on the request, the capturing process captures screens at greater or smaller intervals.

The clients receive the packets and extract the tiles accordingly. The tiles are then incorporated into the output image, giving the client a view similar to the captured data. Because a DSM dispatcher is used, the client is ensured to receive the most up-to-date tiles available while maintaining a frame rate that is related to the available bandwidth.

Figure 13:
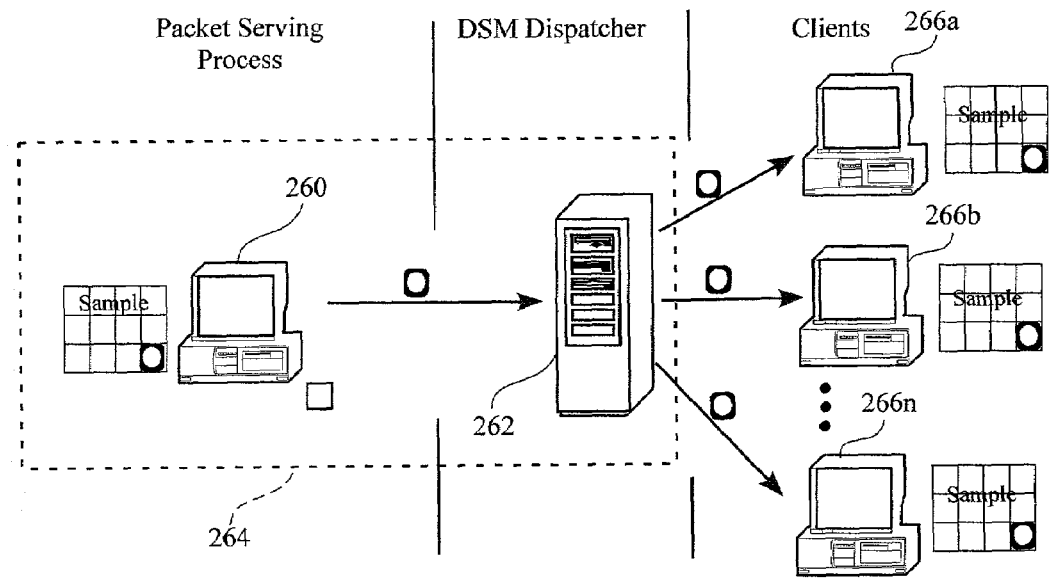
FIG. 13 is a simplified schematic diagram of an exemplary configuration of a system implementing the DSM dispatcher in accordance with one embodiment of the invention.

FIG. 13 is a simplified schematic diagram of an exemplary configuration of a system implementing the DSM dispatcher in accordance with one embodiment of the invention. The packet serving process includes the capture program for capturing the different screen of a slideshow. Computer 260 contains the slideshow to be dispatched. Server 262 includes the code for executing the DSM dispatcher functions where the packets are sent from the packet serving process to the DSM dispatcher. In turn, the DSM dispatcher assembles the packets in a shared fixed size queue for distribution to clients 266a–266n. It should be appreciated that the functionality of the packet serving process and the DSM dispatcher can be incorporated on one computer in one embodiment. Additionally, the code performing the functionality of the packet serving process and the DSM dispatcher can be hard coded onto a semiconductor chip. One skilled in the art will appreciate that the semiconductor chip can include logic gates configured to provide the functionality discussed above. For example, a hardware description language (HDL) can be employed to synthesize the firmware and the layout of the logic gates for providing the necessary functionality described herein.

Figure 14A:
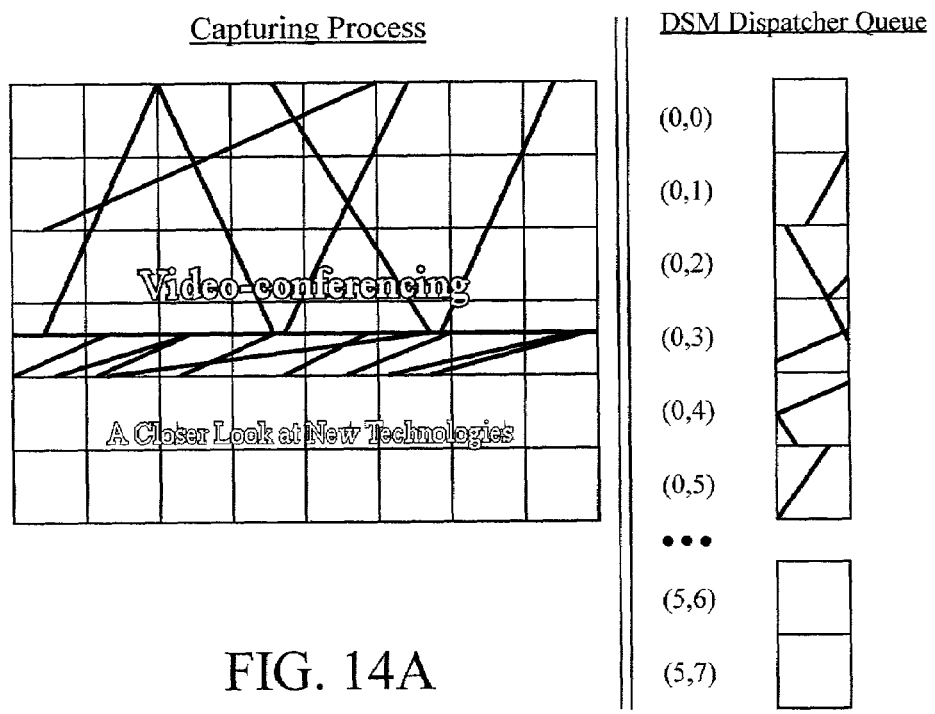
FIGS. 14A–14E provide exemplary schematic diagrams of how tiles from consecutive frames of a slideshow are received and placed into queue by the DSM dispatcher in accordance with on embodiment of the invention.
Figure 14B:
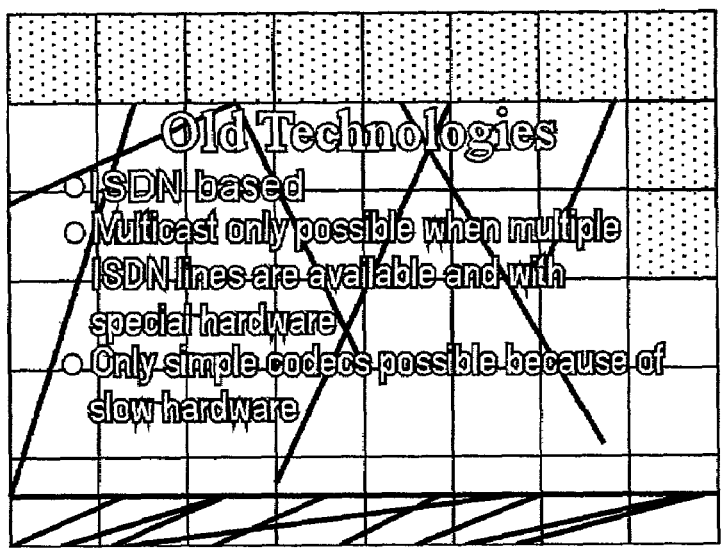
Figure 14B:
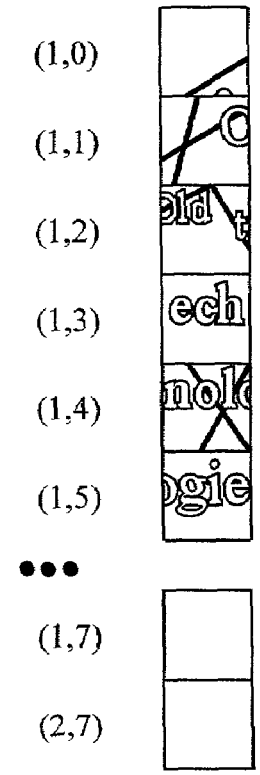
Figure 14C:
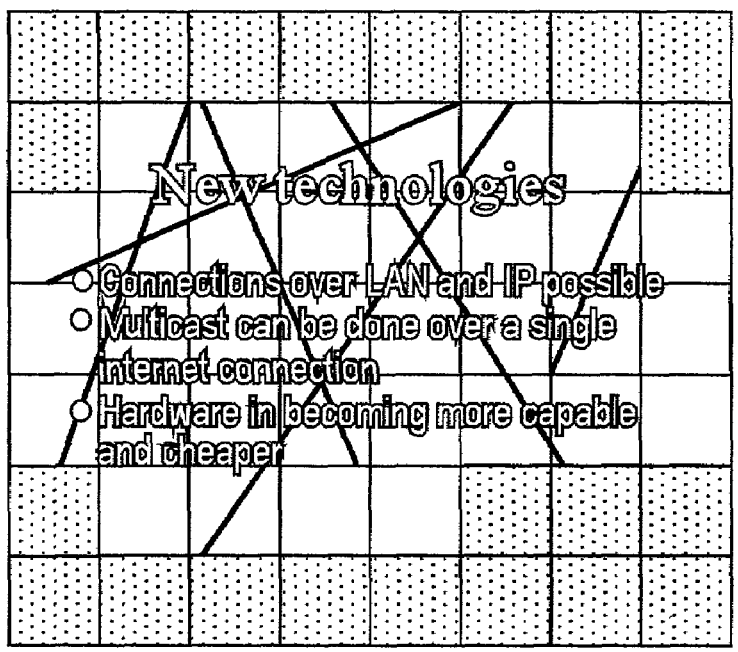
Figure 14C:
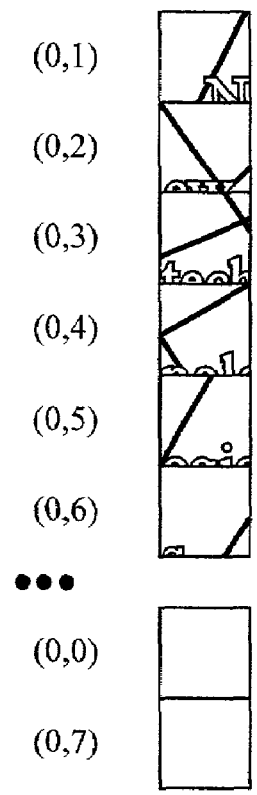
Figure 14D:
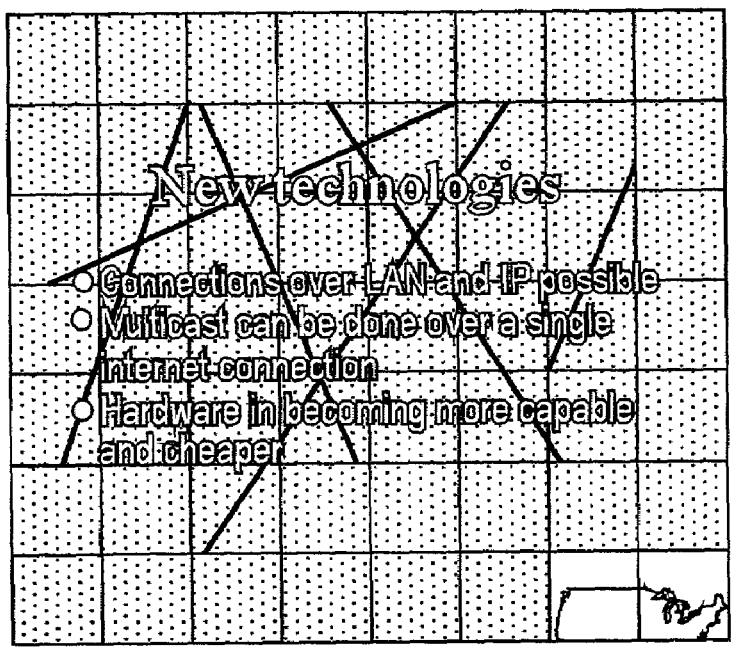
Figure 14D:
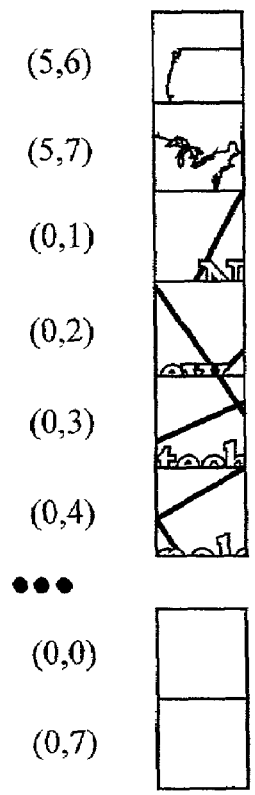
Figure 14E:
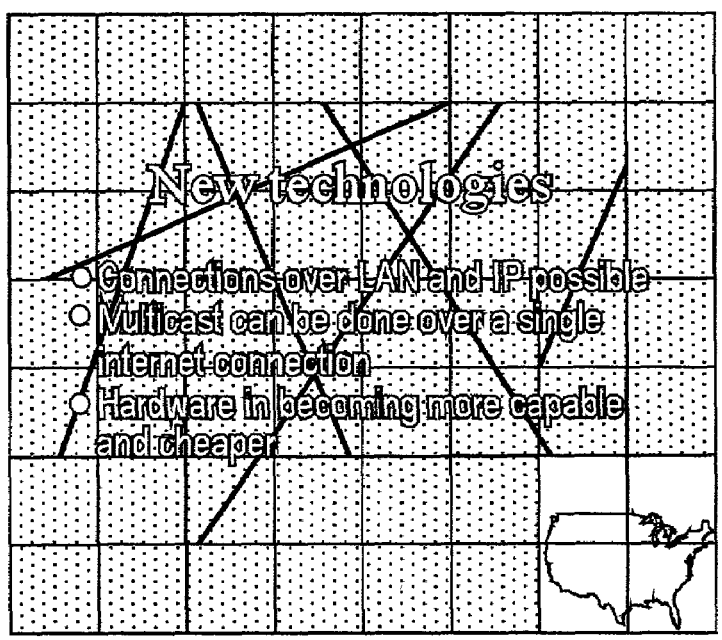
Figure 14E:
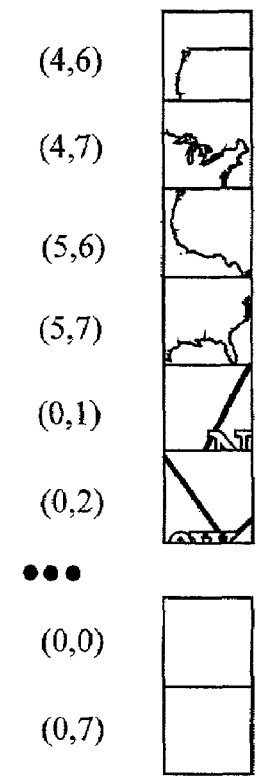

FIGS. 14A–14E provide exemplary diagrams of how tiles from consecutive frames of a slideshow are received and placed into queue by the DSM dispatcher in accordance with on embodiment of the invention. For each of FIGS. 14A–14E the left hand side of the figure represents image data obtained by the capturing process. In this example, the image is divided in 48 tiles for simplicity. Image tiles are named by their location on the screen (x, y). It is assumed that image tiles are fed to the DSM dispatcher from bottom-right to top-left, row-by-row for exemplary purposes here. The right hand side of each figure displays the tiles from the corresponding frame arranged in the shared fixed size queue. FIG. 14A is the first frame is the title frame of the presentation. The entire image is sent over to the dispatcher and as a result a queue is formed starting from (0,0) and ending at (5,7). FIG. 14B is the second frame of the presentation. Here, the top part of the slide has the same background as the last slide from FIG. 14A. Still, approximately a quarter of the image can be recycled from the previous slide: (0,0-7), (1,7) and (2,7). These tiles fall to the bottom of the list, (2,7) being the tile with the lowest time index. FIG. 14C is the third frame of the presentation. The frame of FIG. 14C uses the same exact background as the previous one, which means that a number of frames can be recycled, i.e., only the changed tiles are sent to the dispatcher to replace data in the queue. Tiles (0,0) and (0,7) are the only ones left intact from 2 slides ago, so they fall to the bottom of the list. FIG. 14D is the fourth frame of the presentation. Here, an animated tile emerges from the bottom of the screen in this slide. This change is captured in tiles (5,6) and (5,7), while the remainder of the slide matches the previous one. Hence, only two of the 48 tiles are updated here. FIG. 14E is the fifth frame of the presentation. Here, the animation is finalized as the object stops at the bottom left of the slideshow. This frame is captured in tiles (4,6), (4,7), (5,6), and (5,7). It should be appreciated that the remaining tiles have not changed from the previous frame, therefore, only four tiles out of 48 need to be updated here.

The embodiment described herein can be incorporated with a videoconferencing system, particularly where a slideshow presentation is being transmitted to one or more clients. It will be apparent to one skilled in that high resolution images that do not change significantly between frames can be received at a lower effective bandwidth without sacrificing performance, since only the portion of the images that change between successive frames are transmitted as described above.

In summary, the above described invention allows for a method and system for updating objects in a pre-defined set, such as tile images of a slide show presentation. A DSM dispatcher, that includes a shared fixed size queue, enables the update of changed tiles of an image with minimal memory requirements. Additionally, the DSM dispatcher is configured to inherently accommodate clients with different connection speeds by supplying slower clients with a slower effective frame rate. More aggressive bandwidth control can be supplied through a bandwidth control channel. The DSM dispatcher can easily add new clients by creating a corresponding client pointer pointing below a last valid packet in the shared fixed size queue, without the need to store a base image.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for distributing packets through a multi point dispatcher having a fixed-size buffer shared between multiple clients, comprising:
providing a fixed-size queue configured to contain a plurality of packets;
defining a client pointer for one of the multiple clients, the client pointer indicating a most recent packet in the queue received by the one of the multiple clients;
receiving an updated packet corresponding to a previously received packet in the queue; and
replacing the previously received packet in the queue with the updated packet, the replacing including;
determining if the client pointer is pointing to the packet being replaced;
if the client pointer is pointing to the packet being replaced, the method includes adjusting the client pointer pointing to the packet being replaced to point to a packet below the packet being replaced.

2. The method of claim 1, wherein the fixed size queue includes a head and a tail.

3. The method of claim 2, further including:
adding a new client to receive the packets by pointing a pointer associated with the new client at the tail of the fixed size queue.

4. The method of claim 1, wherein the packets in the fixed size queue are time sorted.

5. The method of claim 1, wherein the packets in the fixed size queue are doubly linked.

6. The method of claim 1, wherein the method operation of replacing the previously received packet in the queue with the undated packet, includes:

locating the previously received packet in the queue; and moving the previously received packet to a top of the queue.

7. The method of claim 4, wherein a client having a slower connection speed is provided a slower frame rate by maintaining the time sort in the fixed size queue.

8. A method for updating a subset of a frame of an image, the frame being subdivided into a plurality of tiles, comprising:
providing a fixed-size queue having a stationary last packet at a bottom of the fixed size queue;
storing a plurality of packets in a time sorted order above the last packet, the plurality of packets corresponding to a frame of an image;
receiving an updated packet corresponding to a previously received packet of the plurality of packets; and
replacing the previously received packet with the updated packet while maintaining the time sorted order, the replacing including,
identifying the previously received packet;
adjusting any pointers pointing at the previously received packet to point at a packet below the previously received packet; and
moving the previously received packet to a top of the fixed size queue.

9. The method of claim 8, wherein the fixed size queue includes a most recently received packet at a top of the queue, the most recently received packet having a pointer pointing to the most recently received packet.

10. The method of claim 8, wherein the plurality of packets are configured as a doubly-linked list.

11. The method of claim 9, further including:
providing bandwidth control for a client.

12. The method of claim 11, wherein the method operation of providing bandwidth control for a client includes:
determining a most recent time stamp by locating the pointer pointing to the most recently received packet;
determining a time stamp corresponding to a packet pointed at by the client pointer;
calculating a difference between the most recent time stamp and the time stamp corresponding to the packet pointed at by the client pointer; and
in response to the difference being above a threshold value, the method includes,
requesting a capture process to capture screens at a greater interval.

13. The method of claim 8, wherein the plurality of packets correspond to a plurality of image tiles of a frame, the plurality of image tiles within the frame capable of varying in size.

14. A computer readable media having program instructions for updating a subset of a frame of an image, the frame being subdivided into a plurality of tiles, comprising:
program instructions for storing a plurality of packets in a time sorted order in a fixed-size queue having a stationary last packet at a bottom of the fixed size queue, the plurality of packets corresponding to a frame of an image;
program instructions for receiving an updated packet corresponding to a previously received packet of the plurality of packets; and
program instructions for replacing the previously received packet with the updated packet while maintaining the time sorted order, the program instructions for replacing including,
program instructions for identifying the previously received packet;
program instructions for adjusting any pointers pointing at the previously received packet to point at a packet below the previously received packet; and
program instructions for moving the previously received packet to a top of the fixed size queue.

15. The computer readable media of claim 14, wherein the fixed size queue includes a most recently received packet at a top of the queue, the most recently received packet having a pointer pointing to the most recently received packet.

16. The computer readable media of claim 14, wherein the plurality of packets are configured as a doubly-linked list.

17. The computer readable media of claim 14, further including:
program instructions for providing bandwidth control for a client.

18. The computer readable media of claim 17, wherein the program instructions for providing bandwidth control for a client includes:
program instructions for determining a most recent time stamp by locating the pointer pointing to the most recently received packet;
program instructions for determining a time stamp corresponding to a packet pointed at by the client pointer;
program instructions for calculating a difference between the most recent time stamp and the time stamp corresponding to the packet pointed at by the client pointer; and
in response to the difference being above a threshold value, the method includes,
program instructions for requesting a capture process to capture screens at a greater interval.

19. An integrated circuit chip configured to dispatch updates to objects in a pre-defined set of objects, comprising:
logic for storing a plurality of packets in a time sorted order in a fixed-size queue having a stationary last packet at a bottom of the fixed size queue, the plurality of packets corresponding to a frame of an image;
logic for receiving an updated packet corresponding to a previously received packet of the plurality of packets; and
logic for replacing the previously received packet with the updated packet while maintaining the time sorted order, the logic for replacing including,
logic for identifying the previously received packet;
logic for adjusting any pointers pointing at the previously received packet to point at a packet below the previously received packet; and
logic for moving the previously received packet to a top of the fixed size queue.

20. The integrated circuit chip of claim 19, wherein the integrated circuit chip is located on a printed circuit board.

21. The integrated circuit chip of claim 19, further including:
logic for providing bandwidth control.

22. A system for distributing objects to multiple clients, comprising:
a plurality of clients, each of the plurality of clients configured to receive image data for display on a computer monitor, the image data being updated periodically;
a server in communication with the client, the server including,
a dispatcher enabled to store a first set of packets defining the image in a fixed-size queue shared by the plurality of clients, the first set of packets being stored according to an introduction into the fixed size queue where a most recently introduced packet is stored at a top of the fixed size queue and a least recently introduced packet is stored at a bottom of the fixed size queue, the dispatcher configured to receive an updated packet, the updated packet replacing a corresponding packet of the first set of packets;

a client pointer associated with each of the plurality of clients, the client pointer pointing to a most recently received packet for the corresponding client, wherein the client pointer is configured to point to a next lower packet in the fixed size queue when the updated packet the most recently received packet for the corresponding client.

23. The system of claim 22, wherein the first set of packets are configured as a doubly linked list.

24. The system of claim 23, wherein the doubly linked list includes a head and a tail.

25. The system of claim 24, wherein a new client is added by creating a new client pointer, the new client pointer initially pointing to the tail of the doubly linked list.

26. The system of claim 22, wherein the server includes a packet serving process, the packet serving process configured to transmit updated packets to the dispatcher.

* * * * *

UNITED STATES PATENT AND TRADEMARK OFFICE
CERTIFICATE OF CORRECTION

PATENT NO. : 7,043,559 B2 Page 1 of 1
APPLICATION NO. : 10/185834
DATED : May 9, 2006
INVENTOR(S) : Ronald Boskovic et al.

It is certified that error appears in the above-identified patent and that said Letters Patent is hereby corrected as shown below:

Claim 22, column 18, line 1, change "updated packet the" to --updated packet is the --

Signed and Sealed this

Third Day of October, 2006

JON W. DUDAS
*Director of the United States Patent and Trademark Office*